Jan. 19, 1943.   W. E. HULSBERG   2,308,757
EXPANSION JOINT
Filed Aug. 16, 1941
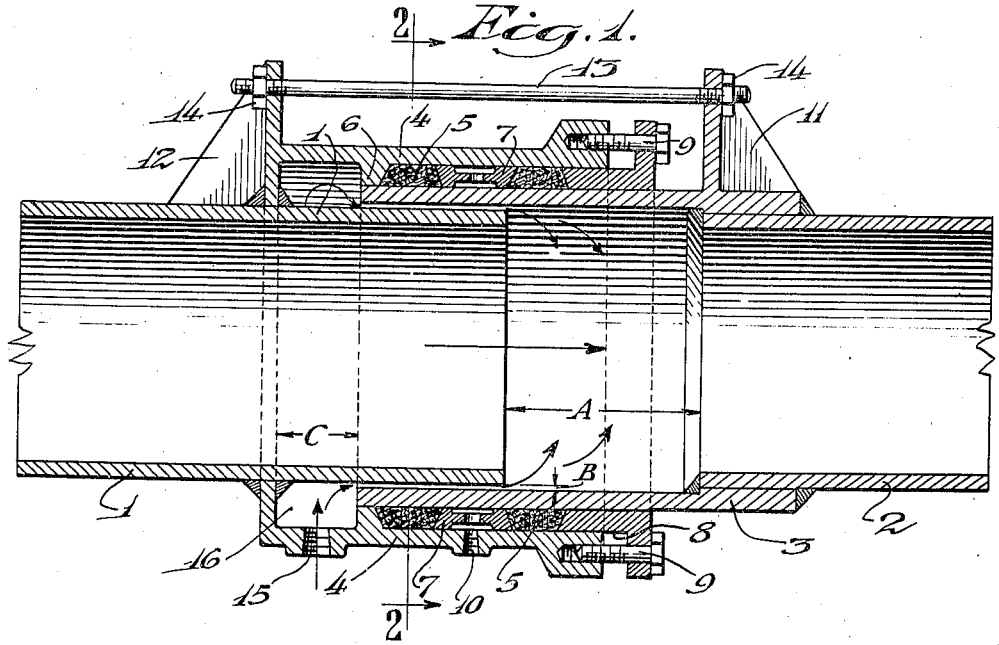
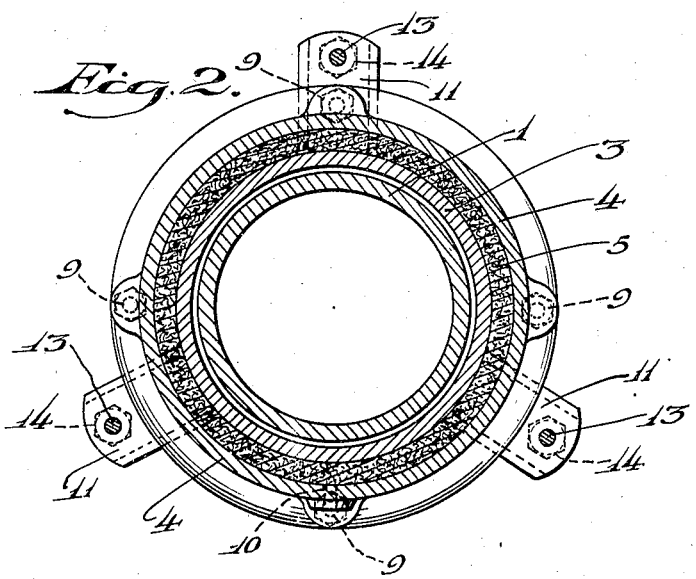
Inventor:
William E. Hulsberg
By Lee J. Gary
Attorney

UNITED STATES PATENT OFFICE 2,308,757

EXPANSION JOINT

William Ernst Hulsberg, Chicago, Ill., assignor to Universal Oil Products Company, Chicago, Ill., a corporation of Delaware Application August 16, 1941, Serial No. 407,123

7 Claims. (Cl. 285—162)

The invention relates to an improved form of expansion joint for tubular fluid conduits, such as pipe lines and the like, which are subject to changes in temperature which cause their pronounced longitudinal expansion and contraction.

In addition to its function for accommodating longitudinal expansion and contraction, the device provided by the invention also provides means for introducing a secondary fluid into the main stream of fluid flowing through the conduit in which the expansion joint is employed. The secondary fluid may be any desired material in either gaseous, liquid or mixture phase and may be introduced into the main stream, in the manner provided, to reduce or increase the temperature of the latter or simply to commingle the two streams. In detailing the apparatus for specific service, its parts may be so designed that the two streams are commingled in any desired proportion. In some instances it will be desirable to introduce a very minor or almost negligible quantity of the secondary fluid into the main stream of fluid passing through the conduits, for the purpose of preventing leakage from the main stream, by maintaining flow of said secondary fluid between relatively close fitted parts of the expansion joint in a direction opposite to that which would result in leakage from the main stream.

The features and advantages of the invention will be apparent with reference to the accompanying diagrammatic drawing and the following description thereof.

Figure 1 of the drawing is an elevational view shown in longitudinal section of one specific form of the apparatus provided by the invention.

Figure 2 is a cross-sectional view of the apparatus illustrated in Figure 1, the section being taken along line 2—2 in Figure 1.

Referring to the drawing, reference Number 1 designates a portion of the tubular fluid conduit through which fluid is passed in the direction indicated by the large arrow and 2 designates an extension of conduit 1, a space indicated at A being provided between the adjacent ends of members 1 and 2 to permit longitudinal expansion of one or both of these members. A sleeve 3 of somewhat larger internal diameter than the external diameter of conduit 1 is provided on the end of member 2 and extends therefrom over the adjacent end of member 1. Sleeve 3, instead of being a separate member rigidly secured to conduit 2, as indicated in the drawing, may be formed integral therewith, when desired. In the case illustrated, it is indicated as being welded to conduit 2, but they may be united by bolted companion flanges or in any other convenient manner.

In constructing the apparatus the clearance or annular space provided between the exterior surface of conduit 1 and the inner surface of sleeve 3 may be made as large or as small as desired. In this particular instance, a noticeable clearance is provided, as indicated at B, but it is within the scope of the invention to make dimension B sufficiently small that the sleeve 3 slidably engages conduit 1. It is also within the scope of the invention to flute or rifle the exterior surface of conduit 1 or the interior surface of sleeve 3 where they overlap in order to maintain a fairly close sliding fit therebetween and insure flow of the secondary fluid into the main stream.

A second sleeve-like member 4 is rigidly secured at one end by welding or in any other convenient manner to conduit 1 at a point on the latter spaced from the free end of sleeve 3, as indicated in the drawing by the dimension line C. Member 4 extends from its point of attachment to conduit 1 over the end of sleeve 3 in the direction of conduit 2, an annular space being provided between members 3 and 4 for the reception of packing, indicated at 5.

A circumferential inner rib 6 on member 4 is slidably engaged with the outer surface of sleeve 3 and forms a retainer for the packing at the inner end of the packing gland. In the particular case illustrated, a lantern gland 7 is provided to divide the packing 5 into two sections, although this is not an essential or novel feature of the invention. A follower 8, fitted within the annular space between members 3 and 4 and provided with take-up bolts 9 threaded into the end of member 4, is provided for keeping packing 5 snugly against the walls of members 3 and 4. A threaded port 10 is provided through the wall of member 4 for the introduction of lubricants into the packing gland, when desired.

A plurality of lugs 11 are provided, in the case here illustrated, on sleeve 3, although they may, when desired, be mounted on and secured to conduit 2, and a plurality of lugs 12 are provided on member 4 or conduit 1, lugs 12 being, in the case here illustrated, a part of member 4 and also secured to conduit 1. The lugs 11 and 12 extend radially outward from the conduits at spaced points about their circumference and are provided with limit bolts 13 extending therebetween and having nuts 14 at their opposite ends. These bolts, nuts and lugs serve to prevent excessive outward telescopic movement of the joint but permit its free inward telescopic movement.

A threaded port 15 is provided through the wall of member 4 and communicates with the annular space 16 provided between members 4 and 1 and between the end of sleeve 3 and the end of member 4 which is attached to conduit 1. In service, steam or any other desired fluid is introduced into space 16 through port 15 at slightly higher pressure than that prevailing in the main stream of fluid passing through conduits 1 and 2, so that the fluid will flow from space 16 through the relatively small annular space B between members 1 and 3 into the main stream of fluid, the direction of flow through space B being the same as the flow through the conduits. Thus, the two streams are commingled and leakage of fluid from the main stream through the packing gland is prevented, since any leakage which occurs past the packing will be from the secondary stream introduced into space 16.

In case it is not desired to introduce any substantial quantity of fluid from space 16 into the main stream of fluid, the space B is reduced in constructing the apparatus to the extent that the outer surface of conduit 1 and the inner surface of sleeve 3 form a sliding fit. Thus, commingling of the two streams may be made almost negligible, when desired, but leakage of the main stream past the packing will still be prevented.

I claim as my invention:

1. An expansion joint for fluid conduits having a pair of overlapping sleeves between which packing is disposed, a third sleeve underlying the inner sleeve of said pair and forming, with the other sleeves, a zone disposed between the main stream of fluid passing through the joint and the packing, and means for introducing fluid under greater pressure than that of said main stream into said zone.

2. An expansion joint for fluid conduits comprising, an inner sleeve and an outer sleeve, each joined to one of said conduits, an intermediate sleeve disposed in slidable relation to the first named sleeves and joined to the other conduit, packing disposed in a space provided between overlapping portions of the outer and intermediate sleeves, said sleeves forming a zone disposed between the packing and the main stream of fluid flowing through said joint and conduits, and means for introducing fluid from an external source into said space, the intermediate and inner sleeves having overlapping portions constructed and arranged to permit the passage of fluid therebetween from said space into said main stream.

3. A device for joining and permitting expansion and contraction in substantially aligned conduits which comprises, a sleeve on one of said conduits extending over the adjacent end of the other conduit, a second sleeve-like member secured at one end to said other conduit and extending over and spaced from the first named sleeve to provide an annular space therebetween for the reception of packing, means for forcing said packing snugly against the sleeves in said annular space, an annular space being provided between the second named conduit and the second named sleeve and between their juncture and the free end of the first named sleeve, and a port directly communicating with the last named annular space being provided through the wall of the second named sleeve.

4. A device for joining and permitting expansion and contraction in substantially aligned conduits which comprises, a sleeve on one of said conduits extending over the adjacent end of the other conduit, a second sleeve-like member spaced from and secured at one end to said other conduit and extending over and spaced from the first named sleeve to provide an annular space therebetween for the reception of packing, means for forcing said packing snugly against the sleeve in said annular space, an annular space being provided between the second named conduit and the second named sleeve and between their juncture and the free end of the first named sleeve, a port directly communicating with the last named annular space being provided through the wall of the second named sleeve, and means permitting inward movement and limiting outward movement of the adjacent ends of the conduits.

5. A device for joining and permitting expansion and contraction in substantially aligned conduits which comprises, a sleeve on one of said conduits extending over the adjacent end of the other conduit, a second sleeve-like member spaced from and secured at one end to said other conduit and extending over and spaced from the first named sleeve to provide an annular space therebetween for the reception of packing, means for forcing said packing snugly against the sleeve in said annular space, an annular space being provided between the second named conduit and the second named sleeve and between their juncture and the free end of the first named sleeve, a port directly communicating with the last named annular space being provided through the wall of the second named sleeve, lugs secured to each of said conduits at spaced points about their circumference and extending outwardly therefrom and limit bolts extending between the lugs on the first and second named conduits and engaged therewith to permit inward movement and limit outward movement of the adjacent ends of the conduits.

6. The device defined in claim 3, wherein an annular space is provided between the first named conduit and the first named sleeve for the passage of fluid from the second named annular space into the main stream of fluid flowing through the conduits.

7. The device defined in claim 3, wherein the free end of the first named conduit and the overlying portion of the first named sleeve are slidably engaged.

WILLIAM ERNST HULSBERG.